United States Patent
Nishimura et al.

(10) Patent No.: US 12,215,239 B2
(45) Date of Patent: Feb. 4, 2025

(54) INK COMPOSITION, INK SET, AND IMAGE RECORDING METHOD

(71) Applicant: FUJIFILM Corporation, Tokyo (JP)

(72) Inventors: Naoko Nishimura, Kanagawa (JP); Naotaka Wachi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 957 days.

(21) Appl. No.: 17/148,580

(22) Filed: Jan. 14, 2021

(65) Prior Publication Data

US 2021/0130630 A1 May 6, 2021

Related U.S. Application Data

(63) Continuation of application No. PCT/JP2019/031552, filed on Aug. 9, 2019.

(30) Foreign Application Priority Data

Sep. 14, 2018 (JP) .................................. 2018-173027

(51) Int. Cl.
*C09D 11/00* (2014.01)
*B41M 5/00* (2006.01)
(Continued)

(52) U.S. Cl.
CPC ......... *C09D 11/322* (2013.01); *B41M 5/0023* (2013.01); *C08K 3/22* (2013.01); *C08K 3/36* (2013.01); *C08K 5/053* (2013.01); *C08K 9/02* (2013.01); *C09D 11/38* (2013.01); *C09D 11/40* (2013.01); *C08K 2003/2227* (2013.01); *C08K 2003/2241* (2013.01); *C08K 2003/2244* (2013.01); *C08K 2201/003* (2013.01)

(58) Field of Classification Search
CPC ....... C09D 11/322; C09D 11/38; C09D 11/40; C08K 3/22; C08K 3/26; C08K 5/053; C08K 2003/2244; C08K 2201/003
USPC ........................ 106/31.01, 31.13, 31.6, 31.85
See application file for complete search history.

(56) References Cited

U.S. PATENT DOCUMENTS

| | | |
|---|---|---|
| 9,133,357 B2 | 9/2015 | Sasada et al. |
| 2003/0089271 A1 | 5/2003 | Hirano et al. |

(Continued)

FOREIGN PATENT DOCUMENTS

| | | |
|---|---|---|
| JP | 2002080760 | 3/2002 |
| JP | 2007119683 | 5/2007 |

(Continued)

OTHER PUBLICATIONS

"Office Action of Japan Counterpart Application" with English translation thereof, issued on Jun. 7, 2022, p. 1-p. 8.

(Continued)

*Primary Examiner* — James E McDonough
(74) *Attorney, Agent, or Firm* — JCIPRNET

(57) ABSTRACT

An ink composition is an ink composition including titanium dioxide particles, metal oxide particles, a dispersant, and water, in which an average particle diameter of the titanium dioxide particles is 100 nm or greater, an average particle diameter of the metal oxide particles is smaller than the average particle diameter of the titanium dioxide particles, and the metal oxide particles are oxide particles of at least one metal selected from the group consisting of zirconium, aluminum, silicon, zinc, and iron.

17 Claims, 1 Drawing Sheet

(51) Int. Cl.
    *C08K 3/22*     (2006.01)
    *C08K 3/36*     (2006.01)
    *C08K 5/053*     (2006.01)
    *C08K 9/02*     (2006.01)
    *C09D 11/322*     (2014.01)
    *C09D 11/38*     (2014.01)
    *C09D 11/40*     (2014.01)

(56) References Cited

U.S. PATENT DOCUMENTS

| | | | |
|---|---|---|---|
| 2010/0091052 A1* | 4/2010 | Ogawa | C09D 11/322 347/100 |
| 2010/0190922 A1 | 7/2010 | Shinozaki et al. | |
| 2011/0227009 A1* | 9/2011 | Yu | C09D 4/06 252/586 |
| 2011/0281032 A1 | 11/2011 | Kagata et al. | |
| 2013/0224451 A1* | 8/2013 | Shiono | C09D 11/38 428/207 |
| 2014/0234595 A1 | 8/2014 | Egami et al. | |
| 2017/0369722 A1 | 12/2017 | Bruinsma et al. | |

FOREIGN PATENT DOCUMENTS

| | | |
|---|---|---|
| JP | 2007332166 | 12/2007 |
| JP | 2010174100 | 8/2010 |
| JP | 2012122028 | 6/2012 |
| JP | 2013181055 | 9/2013 |
| JP | 2014185235 | 10/2014 |
| JP | 2017019918 | 1/2017 |
| JP | 2017025239 | 2/2017 |
| JP | 2017025239 A * | 2/2017 |
| WO | 2013021633 | 2/2013 |

OTHER PUBLICATIONS

"Office Action of Japan Counterpart Application", issued on Dec. 14, 2021, with English translation thereof, pp. 1-7.

"International Search Report (Form PCT/ISA/210) of PCT/JP2019/031552," mailed on Oct. 8, 2019, with English translation thereof, pp. 1-5.

"Written Opinion of the International Searching Authority (Form PCT/ISA/237) of PCT/ JP2019/031552," mailed on Oct. 8, 2019, with English translation thereof, pp. 1-14.

* cited by examiner

5pt
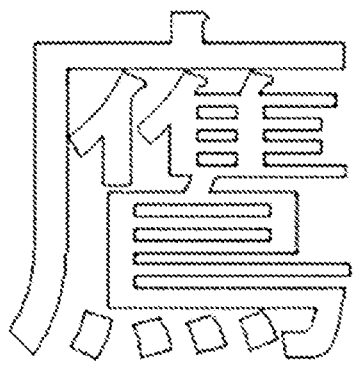
2mm

INK COMPOSITION, INK SET, AND IMAGE RECORDING METHOD

CROSS-REFERENCE TO RELATED APPLICATIONS

This application is a Continuation of PCT International Application No. PCT/JP2019/031552 filed on Aug. 9, 2019, which claims priority under 35 U.S.C § 119(a) to Japanese Patent Application No. 2018-173027 filed on Sep. 14, 2018. Each of the above application(s) is hereby expressly incorporated by reference, in its entirety, into the present application.

BACKGROUND OF THE INVENTION

1. Field of the Invention

The present disclosure relates to an ink composition, an ink set, and an image recording method.

2. Description of the Related Art

Typically, paper (for example, a white background) or the like is frequently used as a recording medium on which an image is recorded. However, in recent years, since the recording medium varies depending on the use mode or the applications of an image, it is desirable that an image is recorded on a material that does not necessarily have a white background. For example, in a case where the material for recording an image is colored or the rear side of the material is seen through, a technique of recording an image without impairing the visibility and sharpness of the recorded image is desired.

In order to improve the above-described situation, it has been proposed to form a base using an ink (for example, a white ink) in the related art. For example, an ink expressing the color of a base is intentionally used in combination with a chromatic colored ink in some cases for the purpose of expressing the color of the base and enhancing the visibility and the sharpness of the image.

As such a technique, JP2007-119683A describes an ink composition containing at least a chromatic pigment, a dispersant, and water, in which the ink composition contains a titanium dioxide pigment and a silica pigment at the same time.

Further, WO2013/021633A describes a white pigment for an aqueous ink which contains a metal compound (1) satisfying the following conditions (A), (B), and (C).

(A) The metal compound (1) contains titanium dioxide and a metal compound (2) having a refractive index of 1.60 to 2.45 at a wavelength of 550 nm, and the content ratio of the titanium dioxide is in a range of 50% by weight to 99% by weight and the content ratio of the metal compound (2) is in a range of 1% by weight to 50% by weight in a case where the total amount of the titanium dioxide and the metal compound (2) is set to 100% by weight.

(B) The peak value of the volume particle size distribution of the metal compound (1) measured by a dynamic light scattering method is in a range of 100 to 700 nm.

(C) The pore volume of the metal compound (1) calculated by a Barrett-Joyner-Halenda (BJH) method is in a range of 0.1 ml/g to 0.65 ml/g.

In recent years, an aqueous ink jet technique is known to use an ink that expresses the color of a base in addition to a chromatic ink as a method of recording an image on a base material such as plastic.

SUMMARY OF THE INVENTION

In a case where the color of the base is white, the ink composition contains a white pigment such as titanium dioxide in many cases, and the white pigment is dispersed using a polymer dispersant. However, the addition of the polymer dispersant promotes thickening of the ink composition and may impair the jettability in a case where an image is recorded using, for example, an ink jet technique.

Further, since titanium dioxide among white pigments has a relatively large particle diameter and a high specific gravity, satisfactory dispersion stabilization is more difficult to realize. There is a demand for significant improvement of the dispersibility of titanium dioxide.

The ink composition described in JP2007-119683A and the ink composition described in WO2013/021633A (for example, an ink composition containing a sintered body of zirconium dioxide-containing titanium dioxide nanoparticles described in Example 1 of WO2013/021633A) are assumed to be in a state where the titanium dioxide particles in the ink composition are satisfactorily dispersed to some extent, but the dispersibility of the titanium dioxide particles is not necessarily sufficient.

An object to be achieved by an aspect of the present disclosure is to provide an ink composition containing titanium dioxide particles and having excellent dispersion stability, an ink set formed of the ink composition, and an image recording method.

Means for achieving the above-described object includes the following aspects.

<1> An ink composition comprising: titanium dioxide particles; metal oxide particles; a dispersant; and water, in which an average particle diameter of the titanium dioxide particles is 100 nm or greater, an average particle diameter of the metal oxide particles is smaller than the average particle diameter of the titanium dioxide particles, and the metal oxide particles are oxide particles of at least one metal selected from the group consisting of zirconium, aluminum, silicon, zinc, and iron.

<2> The ink composition according to <1>, in which the metal oxide particles are at least one kind of particles selected from the group consisting of zirconium dioxide, aluminum oxide, silicon dioxide, zinc oxide, and diiron trioxide.

<3> The ink composition according to <1> or <2>, in which the average particle diameter of the metal oxide particles is in a range of 20 nm to 80 nm.

<4> The ink composition according to any one of <1> to <3>, in which a content of the metal oxide particles is in a range of 0.5% by mass to 35% by mass with respect to a content of the titanium dioxide particles.

<5> The ink composition according to any one of <1> to <4>, in which the metal oxide particles are at least one kind of particles selected from the group consisting of zirconium dioxide, aluminum oxide, and silicon dioxide.

<6> The ink composition according to any one of <1> to <5>, in which the metal oxide particles are zirconium dioxide particles.

<7> The ink composition according to any one of <1> to <6>, in which the titanium dioxide particles are particles having at least one of silicon dioxide or aluminum oxide on each surface thereof.

<8> The ink composition according to any one of <1> to <7>, in which an absolute value of a difference between the average particle diameter of the titanium dioxide particles and the average particle diameter of the metal oxide particles is 50 nm or greater.

<9> The ink composition according to any one of <1> to <8>, in which an absolute value of a difference between the average particle diameter of the titanium dioxide particles and the average particle diameter of the metal oxide particles is in a range of 100 nm to 200 nm.

<10> The ink composition according to any one of <1> to <9>, in which the average particle diameter of the titanium dioxide particles is 200 nm or greater, and the average particle diameter of the metal oxide particles is 60 nm or less.

<11> The ink composition according to any one of <1> to <10>, further comprising: a water-soluble solvent.

<12> The ink composition according to <11>, in which a content of the water-soluble solvent is in a range of 5% by mass to 40% by mass with respect to a total mass of the ink composition.

<13> The ink composition according to <11> or <12>, in which the water-soluble solvent is a glycol-based organic solvent.

<14> The ink composition according to any one of <1> to <13>, in which an acid value of the dispersant is 50 mgKOH/g or less.

<15> The ink composition according to any one of <1> to <14>, in which the ink composition is used for ink jet recording.

<16> An ink set comprising: the ink composition according to any one of <1> to <15>; and a colored ink composition containing water and a colorant.

<17> An image recording method comprising: an ink applying step of applying the ink composition according to any one of <1> to <15> onto a base material; and a colored ink applying step of applying a colored ink composition containing water and a colorant onto the base material.

According to the present disclosure, it is possible to provide an ink composition containing titanium dioxide particles and having excellent dispersion stability, an ink set formed of the ink composition, and an image recording method.

BRIEF DESCRIPTION OF THE DRAWINGS

FIG. 1 is a view conceptually showing a character in a character image used for evaluation of reproducibility of the image in examples.

DESCRIPTION OF THE PREFERRED EMBODIMENTS

In the present disclosure, a numerical range shown using "to" indicates a range including the numerical values described before and after "to" as a lower limit and an upper limit.

In a numerical range described in a stepwise manner in the present disclosure, an upper limit or a lower limit described in a certain numerical range may be replaced with an upper limit or a lower limit in another numerical range described in a stepwise manner.

In the present disclosure, in a case where a plurality of substances corresponding to respective components in a composition are present, the amount of the respective components in the composition indicates the total amount of the plurality of substances present in the composition unless otherwise specified.

In the present disclosure, the meaning of the term "step" includes not only an independent step but also a step whose intended purpose is achieved even in a case where the step is not clearly distinguished from other steps.

In the present disclosure, "image recording" or "recording of an image" indicates that an image is drawn on a base material using an ink composition and a colored ink composition.

In the present disclosure, the "image quality" indicates the definition of an image.

In the present disclosure, a combination of preferred embodiments is a more preferred embodiment.

<<Ink Composition>>

An ink composition according to the embodiment of the present disclosure contains titanium dioxide particles, metal oxide particles, a dispersant, and water.

The average particle diameter of the titanium dioxide particles is 100 nm or greater, the average particle diameter of the metal oxide particles is smaller than the average particle diameter of the titanium dioxide particles, and the metal oxide particles are oxide particles of at least one metal selected from the group consisting of zirconium, aluminum, silicon, zinc, and iron.

<Titanium Dioxide Particles>

The ink composition according to the embodiment of the present disclosure contains titanium dioxide particles having an average particle diameter of 100 nm or greater.

For example, in a case where the ink composition according to the embodiment of the present disclosure is used as a white ink, since the ink composition contains titanium dioxide particles as a pigment, a property in which the rear side of a film in a case of film formation is unlikely to be visually recognized, that is, concealability is excellent.

Titanium dioxide particles serve as a pigment that has satisfactory concealability, but is unlikely to obtain dispersibility. However, the titanium dioxide particles are satisfactorily dispersed in the ink composition according to the embodiment of the present disclosure.

Further, from the viewpoint of the concealability, particles having a large refractive index are preferable as the titanium dioxide particles. The refractive index is preferably 2.0 or greater.

As titanium dioxide, any of an anatase type, a rutile type, a brookite type, and the like can be used. Among these, the rutile type is preferable from the viewpoint of increasing the refractive index. Further, the rutile type has an advantage that the influence on resin components, resin base materials, and the like is small because of a weaker photocatalytic action than that of the anatase type or the brookite type.

In the present disclosure, the "refractive index" indicates a value measured by ellipsometry using visible light having a wavelength of 550 nm at a temperature of 23° C., unless otherwise specified.

[Average Particle Diameter]

The average particle diameter of the titanium dioxide particles in the present disclosure is 100 nm or greater.

In a case where the average particle diameter of the titanium dioxide particles is 100 nm or greater, the concealability can be improved.

From the same point as described above, the average particle diameter of the titanium dioxide particles is preferably 150 nm or greater and more preferably 200 nm or greater.

Further, from the viewpoint of the jetting stability in a case where an ink jet method is used, the average particle diameter of the titanium dioxide particles is preferably 400 nm or less and more preferably 300 nm or less.

In the present disclosure, the average particle diameter indicates the average primary particle diameter. The average particle diameter can be measured by the method described below.

[Content]

The content of the titanium dioxide particles is preferably in a range of 1% by mass to 20% by mass, more preferably in a range of 3% by mass to 18% by mass, and still more preferably in a range of 5% by mass to 15% by mass with respect to the total mass of the ink composition.

—Surface Treatment—

The titanium dioxide particles in the present disclosure may be surface-treated particles.

In a case where the titanium dioxide particles are subjected to a surface treatment, the dispersibility of the titanium dioxide particles can be further improved.

The surface treatment performed on the titanium dioxide in the present disclosure can be carried out with, for example, silicon dioxide, aluminum oxide, zirconium dioxide, or an organic substance (such as a polyol or a siloxane).

Among these, from the viewpoint of improving the dispersibility of the titanium dioxide particles, silicon dioxide and aluminum oxide are preferable.

It is preferable that the titanium dioxide particles in the present disclosure are particles having silicon dioxide or aluminum oxide on each surface thereof by being subjected to a surface treatment. In a case where the titanium dioxide particles is subjected to a surface treatment with silicon dioxide or aluminum oxide, particles having silicon dioxide or aluminum oxide on each surface thereof can be generated.

(Metal Oxide Particles)

The ink composition according to the embodiment of the present disclosure contains not only a dispersant (described below) that allows the titanium dioxide particles to be dispersed, but also metal oxide particles. The metal oxide particles are oxide particles of at least one metal selected from the group consisting of zirconium, aluminum, silicon, zinc, and iron and preferably at least one kind of particles selected from the group consisting of zirconium dioxide, aluminum oxide, silicon dioxide, zinc oxide, and diiron trioxide.

Since the ink composition contains metal oxide particles as a dispersion assistant in addition to the dispersant, the function of dispersing the titanium dioxide particles in the ink composition can be greatly improved. That is, in a case where the metal oxide particles with a property of having an excellent affinity for titanium dioxide particles satisfactorily interact with the titanium dioxide particles, excellent dispersibility can be imparted to the titanium dioxide particles in the ink composition.

Further, the ink composition contains metal oxide particles having an average particle diameter smaller than that of the titanium dioxide particles. Since the average particle diameter of the metal oxide particles is smaller than the average particle diameter of the titanium dioxide particles, the metal oxide particles are easily adsorbed on the titanium dioxide particles, and thus the dispersibility of the titanium dioxide particles can be further improved.

From the viewpoint of the dispersibility, the metal oxide particles in the present disclosure are preferably at least one kind of particles selected from the group consisting of zirconium dioxide, aluminum oxide, and silicon dioxide and more preferably zirconium dioxide particles.

Particularly, the zirconium dioxide in the present disclosure is a homologous element to titanium dioxide particles, has a similar electron orbit, and has excellent crystallinity. It is assumed that zirconium oxide satisfactorily interacts with the titanium dioxide particles due to the above-described properties so that the dispersibility of the titanium dioxide particles can be significantly improved.

The average particle diameter (the average primary particle diameter) of the metal oxide particles is smaller than the average particle diameter of the titanium dioxide particles.

The average particle diameter of the metal oxide particles is preferably less than 100 nm.

In this manner, the dispersibility of the titanium dioxide particles in the ink composition can be further improved.

From the same viewpoint as described above, the average particle diameter of the metal oxide particles is more preferably 80 nm or less and still more preferably 60 nm or less.

Further, from the viewpoint of the dispersibility of the titanium dioxide particles in the ink composition, the average particle diameter of the metal oxide particles is preferably 20 nm or greater and more preferably 30 nm or greater. Here, the average particle diameter of the metal oxide particles is still more preferably in a range of 20 nm to 80 nm.

Further, the average particle diameter can be measured by the method described below.

In the present disclosure, the absolute value of the difference between the average particle diameter of the titanium dioxide particles and the average particle diameter of the metal oxide particles is preferably 50 nm or greater. In a case where the absolute value of the difference between the average particle diameter of the titanium dioxide particles and the average particle diameter of the metal oxide particles is 50 nm or greater, the metal oxide particles are more easily adsorbed on the titanium dioxide particles so that the dispersibility of the titanium dioxide particles in the ink composition can be further improved.

From the same viewpoint as described above, the absolute value of the difference between the average particle diameter of the titanium dioxide particles and the average particle diameter of the metal oxide particles is more preferably 80 nm or greater and still more preferably 100 nm or greater.

In the present disclosure, the absolute value of the difference between the average particle diameter of the titanium dioxide particles and the average particle diameter of the metal oxide particles is preferably 200 nm or less. In this manner, the dispersibility of the titanium dioxide particles in the ink composition can be satisfactorily maintained.

From the viewpoint described above, the absolute value of the difference between the average particle diameter of the titanium dioxide particles and the average particle diameter of the metal oxide particles is more preferably 170 nm or less.

For example, the absolute value of the difference between the average particle diameter of the titanium dioxide particles and the average particle diameter of the metal oxide particles is preferably in a range of 100 nm to 200 nm.

In the present disclosure, it is preferable that the average particle diameter of the titanium dioxide particles is 100 nm or greater and the particle diameter of the metal oxide particles is less than 100 nm. In this manner, the dispersibility of the titanium dioxide particles in the ink composition can be further improved, and an image with excellent concealability can be recorded.

From the viewpoint described above, it is more preferable that the average particle diameter of the titanium dioxide particles is 150 nm or greater and the particle diameter of the metal oxide particles is 80 nm or less. Further, it is still more preferable that the average particle diameter of the titanium dioxide particles is 200 nm or greater and the particle diameter of the metal oxide particles is 60 nm or less.

The average particle diameter of the titanium dioxide particles and the metal oxide particles can be measured by the following measuring method.

The state where the titanium dioxide particles and the metal oxide particles are present can be measured using a high-resolution electron energy loss spectroscopic electron microscope (HREELS-TEM). HREELS-TEM is a method of combining a high-resolution transmission electron microscope (TEM) and electron energy loss spectroscopy (EELS) that can measure the electronic structure, the composition, and the like based on the energy distribution spectrum of electrons that have passed through the sample. In this manner, qualitative and quantitative analysis of light elements that are difficult to measure with a typical electron microscopes can be performed.

Specifically, a coating film of an ink composition having a thickness of approximately 0.3 mm to 0.6 mm is prepared using a hand coating bar and an ink composition to perform STEM-EELS analysis with a field emission electron microscope (HRTEM), the EELS intensity map is divided into 5 nm intervals on the STEM image with respect to the total thickness of the coating film, and EELS spectra are acquired from each divided area. Further, the average primary particle diameter of the titanium dioxide particles and the metal oxide particles is acquired by measuring the equivalent circle diameters of 300 independent particles that do not overlap each other in the image in which the acquired EELS spectra are expanded at a magnification of 100000 times using a transmission electron microscope (for example, 1200EX (manufactured by JEOL Ltd.)) and calculating the average value thereof as an arithmetic average particle diameter.

[Content]

The content of the metal oxide particles is preferably in a range of 0.5% by mass to 40% by mass, more preferably in a range of 0.5% by mass to 35% by mass, still more preferably in a range of 1% by mass to 30% by mass, and particularly preferably in a range of 2% by mass to 25% by mass with respect to the content of the titanium dioxide particles.

<Dispersant>

The ink composition according to the embodiment of the present disclosure contains a dispersant (hereinafter, the dispersant contained in the ink composition is also referred to as a first dispersant).

Since the ink composition contains the first dispersant, the titanium dioxide particles contained in the ink composition can be dispersed.

As the first dispersant, any of a polymer dispersant or a low-molecular-weight surfactant-type dispersant may be used. Further, as the polymer dispersant, any of a water-soluble dispersant or a water-insoluble dispersant may be used.

Preferred examples of the first dispersant include dispersants described in paragraphs 0080 to 0096 of JP2016-145312A.

—Acid Value—

The acid value of the first dispersant in the present disclosure is preferably 50 mgKOH/g or less.

In this manner, the reaction between the first dispersant and the components in the ink composition can be suppressed, the dispersibility of the dispersed components of the ink composition can be improved, and the storage stability of the ink composition can be satisfactorily maintained.

From the viewpoint described above, the acid value is preferably 30 mgKOH/g or less and more preferably 25 mgKOH/g or less. Further, the lower limit of the acid value may be 0 mgKOH/g, but is preferably 5 mgKOH/g or greater and more preferably 10 mgKOH/g or greater. The lower limit of the acid value may be 0 mgKOH/g, but in a case where the amine value described below is 0 mgKOH/g, the acid value is preferably greater than 0 mgKOH/g.

Further, the acid value of the first dispersant can be measured by titration with an indicator. Specifically, the acid value thereof can be calculated by measuring the milligrams of potassium hydroxide that neutralizes the acid component in 1 g of the solid content of the dispersant in conformity with the method described in JIS K 0070:1992.

It is preferable that the dispersant contained in the ink composition contains a salt of an acid group from the viewpoint of the dispersibility.

Examples of the salt of the acid group include salts of sulfonic acid, carboxylic acid, phosphoric acid, and phosphonic acid. Among these, a salt of sulfonic acid and a salt of carboxylic acid are preferable.

As the kind of salt, alkali metal salts and amine salts are preferable. Among these, salts of sodium, diethanolamine, and potassium are preferable.

—Amine Value—

The amine value of the dispersant contained in the ink composition is preferably in a range of 0 mgKOH/g to 50 mgKOH/g.

In a case where the amine value thereof is 50 mgKOH/g or less, the dispersion stability of the dispersed components in the ink composition can be satisfactorily maintained.

From the same viewpoint as described above, the amine value of the first dispersant is more preferably 45 mgKOH/g or less and still more preferably 30 mgKOH/g or less.

The amine value may be 0 mgKOH/g, but in a case where the acid value is 0 mgKOH/g, the amine value is preferably greater than 0 mgKOH/g.

Further, the amine value shows the total amount of a free base and a base and is expressed by the milligrams of potassium hydroxide equivalent to hydrochloric acid required to neutralize 1 g of a sample.

The amine value is a value measured by a method in conformity with JIS K7237 (1995).

—Weight-Average Molecular Weight—

The weight-average molecular weight of the dispersant is preferably in a range of 10000 to 50000.

In a case where the weight-average molecular weight thereof is 10000 or greater, the amount of water-soluble components can be effectively suppressed. Further, in a case where the weight-average molecular weight thereof is 50000 or less, the dispersibility can be enhanced.

From the same viewpoint as described above, the weight-average molecular weight of the first dispersant is more preferably in a range of 15000 to 45000 and still more preferably in a range of 20000 to 40000.

The weight-average molecular weight is a value measured by gel permeation chromatography (GPC).

The measurement according to GPC is performed using HLC (registered trademark)-8020GPC (manufactured by Tosoh Corporation) as a measuring device, three columns of TSKgel (registered trademark) Super Multipore HZ-H (manufactured by Tosoh Corporation, 4.6 mmID×15 cm), and tetrahydrofiran (THF) as an eluent. Further, the measurement is performed under measurement conditions of a sample concentration of 0.45% by mass, a flow rate of 0.35 ml/min, a sample injection volume of 10 μl, and a measurement temperature of 40° C. using a differential refractive index (RI) detector.

Further, the calibration curve is prepared using eight samples of "F-40", "F-20", "F-4", "F-1", "A-5000", "A-2500", "A-1000", and "n-propylbenzene" which are "Standard Samples TSK standard, polystyrene" (manufactured by Tosoh Corporation).

A commercially available product may be used as the first dispersant, and examples thereof include ARON (registered trademark) A6330 (manufactured by Toagosei Co., Ltd., acid value: 20 mgKOH/g, amine value: 0 mgKOH/g), BYK190 (manufactured by BYK Chemie Japan KK, acid value: 10 mgKOH/g, amine value: 0 mgKOH/g), EFKA (registered trademark) PX4701 (manufactured by BASF SE, acid value: 0 mgKOH/g, amine value: 40 mgKOH/g), BYK2012 (manufactured by BYK Chemie Japan KK, acid value: 7 mgKOH/g, amine value: 7 mgKOH/g), BYK ANTI TERRA 25 (manufactured by BYK Chemie Japan KK, acid value: 46 mgKOH/g, amine value: 41 mgKOH/g), A6012 (manufactured by Toagosei Co., Ltd., acid value: 14 mgKOH/g, amine value: 0 mgKOH/g), and BYK-2010 (manufactured by BYK Chemie Japan KK, acid value: 20 mgKOH/g, amine value: 0 mgKOH/g).

Specific examples of the first dispersant include the followings. Here, the first dispersant in the present disclosure is not limited thereto.

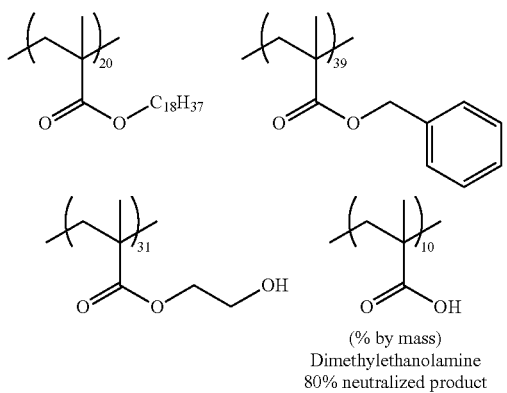

P-3

(% by mass)
Dimethylethanolamine
80% neutralized product

The content of the first dispersant is preferably in a range of 0.5% by mass to 20% by mass, more preferably in a range of 1.0% by mass to 15% by mass, and still more preferably in a range of 1.5% by mass to 10% by mass with respect to the content of all the titanium dioxide particles contained in the ink composition.
<Water>

The ink composition contains water.

As water, for example, ion exchange water, distilled water, or the like can be used.

The content of water is preferably in a range of 50% by mass to 90% by mass and more preferably in a range of 60% by mass to 80% by mass with respect to the total mass of the ink composition.
<Water-Soluble Solvent>

It is preferable that the ink composition contains at least one water-soluble solvent.

In this manner, the effect of suppressing drying of the ink composition or the effect of wetting the ink composition can be obtained.

The term "water-soluble" indicates that the amount of the solvent to be dissolved in 100 parts by mass of water at 25° C. is 0.1 part by mass or greater (preferably 1 part by mass or greater, more preferably 5 parts by mass or greater, and still more preferably 10 parts by mass or greater).

The water-soluble solvent which may be contained in the ink composition can be used, for example, as an anti-drying agent that prevents clogging due to aggregates formed by the ink composition being attached to an ink jet port of an injection nozzle and being dried.

From the viewpoints of suppressing drying and performing wetting, as the water-soluble solvent contained in the ink composition, a water-soluble solvent having a lower vapor pressure than that of water is preferable.

In addition, the boiling point of the water-soluble solvent at 1 atm (1013.25 hPa) is preferably in a range of 80° C. to 300° C. and more preferably in a range of 120° C. to 250° C.

In a case where the water-soluble solvent is used as an anti-drying agent, it is preferable that the water-soluble solvent is a water-soluble solvent having a lower vapor pressure than that of water.

Specific examples of such a water-soluble solvent include polyhydric alcohols represented by ethylene glycol, propylene glycol, diethylene glycol, polyethylene glycol, thiodiglycol, dithiodiglycol, 2-methyl-1,3-propanediol, 1,2,6-hexanetriol, an acetylene glycol derivative, glycerin, and trimethylolpropane.

Among these, polyhydric alcohol such as glycerin or diethylene glycol is preferable as the anti-drying agent.

The anti-drying agent may be used alone or in combination of two or more kinds thereof.

The water-soluble solvent may be used for adjusting the viscosity of the ink composition in addition to the purpose of use described above.

Specific examples of the water-soluble solvent which can be used for adjusting the viscosity include alcohols (such as methanol, ethanol, propanol, isopropanol, butanol, isobutanol, sec-butanol, t-butanol, pentanol, hexanol, cyclohexanol, and benzyl alcohol), polyhydric alcohols (such as ethylene glycol, diethylene glycol, triethylene glycol, polyethylene glycol, propylene glycol, dipropylene glycol, polypropylene glycol, butylene glycol, hexanediol, pentanediol, glycerin, hexanetriol, and thiodiglycol), glycol derivatives (such as ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, triethylene glycol monobutyl ether, and ethylene glycol monophenyl ether), amines (such as ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, and tetramethylpropylenediamine), and other polar solvents (such as formamide, N,N-dimethylformamide, N,N-dimethylacetamide, dimethyl sulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, and acetone).

Among these, from the viewpoint of the dispersion stability of the ink composition, it is preferable that the water-soluble solvent is a glycol-based organic solvent.

Examples of the glycol-based organic solvent include ethylene glycol, propylene glycol, diethylene glycol, polyethylene glycol, thiodiglycol, dithiodiglycol, and the above-described glycol derivatives. Among these, ethylene glycol, propylene glycol, diethylene glycol, polyethylene glycol, thiodiglycol, or dithiodiglycol is preferable.

The content of the water-soluble solvent is preferably in a range of 1% by mass to 50% by mass with respect to the total mass of the ink composition.

In a case where the content of the water-soluble solvent is 1% by mass or greater, the jettability in a case of jetting the ink composition by the ink jet method can be improved.

In a case where the content of the water-soluble solvent is 50% by mass or less, the dispersion stability and the filterability of the ink composition can be satisfactorily maintained.

From the viewpoint described above, the content of the water-soluble solvent is preferably in a range of 3% by mass to 40% by mass and more preferably in a range of 5% by mass to 40% by mass with respect to the total mass of the ink composition.

<Resin Particles>

The ink composition according to the embodiment of the present disclosure may contain resin particles.

The resin particles in the present disclosure may be used, for example, in the form of a latex that is a dispersion in which a resin is dispersed in water in the form of particles. By adding the resin particles in the form of a latex, the film quality performance in a case of film formation can be improved.

Here, the concept of the latex includes both an emulsified state (emulsion) in which a water-insoluble polymer is dispersed in an aqueous medium in a liquid state and a dispersed state (suspension) in which a water-insoluble polymer is dispersed in an aqueous medium in a solid state.

[Resin]

Examples of the resin in the resin particles include an acrylic resin, an epoxy resin, a polyether resin, a polyamide resin, an unsaturated polyester resin, a phenol resin, a silicone resin, a fluororesin, a polyvinyl resin (such as vinyl chloride, vinyl acetate, polyvinyl alcohol, or polyvinyl butyral), an alkyd resin, a polyester resin (such as a phthalic acid resin), and an amino material (such as a melamine resin, a melamine formaldehyde resin, an aminoalkyd co-condensation resin, or a urea resin).

Among the above-described resins, as the resin particles, particles of an acrylic resin, a polyether resin, a polyester resin, and a polyolefin resin are preferable. Further, from the viewpoint of improving the concealability, particles of an acrylic resin are more preferable.

Further, in the present specification, the acrylic resin indicates a resin having a constitutional unit derived from (meth)acrylic acid or a (meth)acrylate compound. The acrylic resin may have a constitutional unit other than the constitutional unit derived from the (meth)acrylic acid or the (meth)acrylate compound.

Further, the resin forming the resin particles may be a copolymer having two or more kinds of constitutional units constituting the resins exemplified above or a mixture of two or more kinds of the resins. Further, the resin particles may be formed of a mixture of two or more kinds of resins and may be composite resin particles obtained by laminating two or more kinds of resins in the form of, for example, a core and a shell.

As the resin particles, resin particles obtained by a phase-transfer emulsification method are preferable and particles of a self-dispersing resin (self-dispersing resin particles) described below are more preferable.

Here, the self-dispersing resin indicates a water-insoluble resin which may enter a dispersed state in an aqueous medium by a functional group (particularly, an acidic group of a carboxy group or the like or a salt thereof) contained in the resin itself in a case where the resin has entered the dispersed state according to the phase-transfer emulsification method in the absence of a surfactant.

In addition, the term "water-insoluble" indicates that the amount of substance to be dissolved in 100 parts by mass of water (25° C.) is less than 5.0 parts by mass (preferably less than 1.0 parts by mass).

As the phase-transfer emulsification method, a method of dissolving or dispersing a resin in a solvent (for example, a water-soluble solvent), putting the solution into water without adding a surfactant thereto, stirring and mixing the solution, and removing the solvent in a state in which a salt-forming group (for example, an acidic group such as a carboxy group) contained in the resin is neutralized, to obtain an aqueous dispersion in an emulsified or dispersed state is exemplified.

The self-dispersing resin particles can be selected from among self-dispersing resin particles described in paragraphs 0090 to 0121 of JP2010-064480A and paragraphs 0130 to 0167 of JP2011-068085A and then used. Particularly, it is preferable that particles having a glass transition temperature of higher than 120° C. are selected from among self-dispersing resin particles described in the same publications and then used.

Self-dispersing resin particles containing a carboxy group are preferable as the self-dispersing resin particles.

As the form of the self-dispersing resin particles containing a carboxy group, a form in which particles formed of a resin having a constitutional unit derived from an unsaturated carboxylic acid (preferably (meth)acrylic acid) is more preferable.

As the form of the self-dispersing resin particles containing a carboxy group, a form in which particles formed of a resin having a constitutional unit containing an alicyclic group, a constitutional unit containing an alkyl group, and a constitutional unit derived from an unsaturated carboxylic acid (preferably (meth)acrylic acid) is still more preferable.

The content of the constitutional unit containing an alicyclic group in the above-described resin (the total content in a case where two or more kinds of constitutional units are present) is preferably in a range of 3% by mass to 95% by mass, more preferably in a range of 5% by mass to 75% by mass, and still more preferably in a range of 10% by mass to 50% by mass with respect to the total mass of the resin.

The content of the constitutional unit containing an alkyl group in the above-described resin (the total content in a case where two or more kinds of constitutional units are present) is preferably in a range of 5% by mass to 90% by mass, more preferably in a range of 10% by mass to 85% by mass, still more preferably in a range of 20% by mass to 80% by mass, even still more preferably in a range of 30% by mass to 75% by mass, and even still more preferably in a range of 40% by mass to 75% by mass with respect to the total mass of the resin.

The content of the constitutional unit derived from unsaturated carboxylic acid (preferably (meth)acrylic acid) in the above-described resin (the total content in a case where two or more kinds of constitutional units are present) is preferably in a range of 2% by mass to 30% by mass, more preferably in a range of 5% by mass to 20% by mass, and still more preferably in a range of 5% by mass to 15% by mass with respect to the total mass of the resin.

Further, a form in which the constitutional unit containing an alicyclic group is changed into a constitutional unit containing an aromatic group or a form which has a constitutional unit containing an aromatic group in addition to the constitutional unit containing an alicyclic group, in the "still more preferable form of the self-dispersing resin particles containing a carboxy group" described above, is also preferable as the form of self-dispersing resin particles containing a carboxy group.

In both forms, the total content of the constitutional unit containing an alicyclic group and the constitutional unit containing an aromatic group is preferably in a range of 3% by mass to 95% by mass, more preferably in a range of 5% by mass to 75% by mass, and still more preferably in a range of 10% by mass to 50% by mass with respect to the total amount of the resin.

It is preferable that the constitutional unit containing an alicyclic group is a constitutional unit derived from alicyclic (meth)acrylate.

Examples of the alicyclic (meth)acrylate include monocyclic (meth)acrylate, bicyclic (meth)acrylate, and tricyclic (meth)acrylate.

Examples of the monocyclic (meth)acrylate include cycloalkyl (meth)acrylate in which the number of carbon atoms in a cycloalkyl group is in a range of 3 to 10, such as cyclopropyl (meth)acrylate, cyclobutyl (meth)acrylate, cyclopentyl (meth)acrylate, cyclohexyl (meth)acrylate, cycloheptyl (meth)acrylate, cyclooctyl (meth)acrylate, cyclononyl (meth)acrylate, or cyclodecyl (meth)acrylate.

Examples of the bicyclic (meth)acrylate include isobornyl (meth)acrylate and norbornyl (meth)acrylate.

Examples of the tricyclic (meth)acrylate include adamantyl (meth)acrylate, dicyclopentanyl (meth)acrylate, and dicyclopentenyloxyethyl (meth)acrylate.

These may be used alone or in the form of a mixture of two or more kinds thereof.

Among these, from the viewpoints of the fixing property, the blocking resistance, and the dispersion stability of the self-dispersing resin particles, bicyclic (meth)acrylate or tri- or higher cyclic polycyclic (meth)acrylate is preferable; and isobornyl (meth)acrylate, adamantyl (meth)acrylate, or dicyclopentanyl (meth)acrylate is more preferable.

As the constitutional unit containing an aromatic group, a constitutional unit derived from an aromatic group-containing monomer is preferable.

Examples of the aromatic group-containing monomer include an aromatic group-containing (meth)acrylate monomer (such as phenoxyethyl (meth)acrylate, benzyl (meth)acrylate, or phenyl (meth)acrylate) and a styrene compound.

Among these, from the viewpoints of the balance between the hydrophilicity and the hydrophobicity of the resin chain and the ink fixing property, an aromatic group-containing (meth)acrylate monomer is preferable; phenoxyethyl (meth)acrylate, benzyl (meth)acrylate, or phenyl (meth)acrylate is more preferable; and phenoxyethyl (meth)acrylate or benzyl (meth)acrylate is still more preferable.

As the constitutional unit containing an alkyl group, a constitutional unit derived from an alkyl group-containing monomer is preferable.

Examples of the alkyl group-containing monomer include alkyl (meth)acrylate such as methyl (meth)acrylate, ethyl (meth)acrylate, isopropyl (meth)acrylate, n-propyl (meth)acrylate, n-butyl (meth)acrylate, isobutyl (meth)acrylate, t-butyl (meth)acrylate, hexyl (meth)acrylate, or ethylhexyl (meth)acrylate; an ethylenically unsaturated monomer containing a hydroxyl group such as hydroxymethyl (meth)acrylate, 2-hydroxyethyl (meth)acrylate, 2-hydroxypropyl (meth)acrylate, 4-hydroxybutyl (meth)acrylate, hydroxypentyl (meth)acrylate, or hydroxyhexyl (meth)acrylate; dialkylaminoalkyl (meth)acrylate such as dimethylamonoethyl (meth)acrylate; and (meth)acrylamide, for example, N-hydroxyalkyl (meth)acrylamide such as N-hydroxymethyl (meth)acrylamide, N-hydroxyethyl (meth)acrylamide, or N-hydroxybutyl (meth)acrylamide, and N-alkoxyalkyl (meth)acrylamide such as N-methoxymethyl (meth)acrylamide, N-ethoxymethyl (meth)acrylamide, N-(n-,iso)butoxymethyl(meth)acrylamide, N-methoxyethyl(meth)acrylamide, N-ethoxyethyl (meth)acrylamide, or N-(n-,iso)butoxyethyl(meth)acrylamide.

Among these, alkyl (meth)acrylate is preferable; alkyl (meth)acrylate in which the number of carbon atoms in an alkyl group is in a range of 1 to 4 is more preferable; methyl (meth)acrylate, ethyl (meth)acrylate, isopropyl (meth)acrylate, or butyl (meth)acrylate is still more preferable; and methyl (meth)acrylate is even still more preferable.

The weight-average molecular weight of the resin constituting the resin particles (preferably the self-dispersing resin particles, the same applies hereinafter) is preferably in a range of 3000 to 200000, more preferably in a range of 5000 to 150000, and still more preferably in a range of 10000 to 100000.

In a case where the weight-average molecular weight thereof is 3000 or greater, the amount of water-soluble components can be effectively suppressed. Further, the self-dispersion stability can be improved by setting the weight-average molecular weight thereof to 200000 or less.

The weight-average molecular weight of the resin forming the resin particles can be measured by the method described above.

From the viewpoints of the self-dispersibility and the aggregation rate, the resin constituting the resin particles is preferably a resin having an acid value of 100 mgKOH/g or less and more preferably a resin having an acid value of 25 mgKOH/g to 100 mgKOH/g.

The acid value of the resin constituting the resin particles can be measured by the method described above.

The volume average particle diameter of the resin particles is preferably in a range of 1 nm to 200 nm, more preferably in a range of 1 nm to 150 nm, still more preferably in a range of 1 nm to 100 nm, and particularly preferably in a range of 1 nm to 10 nm. In a case where the volume average particle diameter thereof is 1 nm or greater, the manufacturing suitability is improved. Further, in a case where the volume average particle diameter is 200 nm or less, the storage stability is improved. Further, the particle size distribution of resin particles is not particularly limited, and any of resin particles having a wide particle size distribution or resin particles having a monodispersed particle size distribution may be used.

In the present disclosure, the volume average particle diameter of the resin particles can be acquired by performing measurement according to a dynamic light scattering method using a nanotrac particle size distribution measurement apparatus UPA-EX150 (manufactured by Nikkiso Co., Ltd.).

From the viewpoint of improving the concealability, the refractive index of the resin particles is preferably in a range of 1.0 to 1.7.

The resin particles may be used alone or in combination of two or more kinds thereof.

The content of the resin particles (preferably self-dispersing resin particles) in the ink composition (the total content in a case where two or more kinds of particles are present) is not particularly limited, but is preferably in a range of 1.0% by mass to 12.0% by mass, more preferably in a range of 3.0% by mass to 10.0% by mass, and still more preferably in a range of 5.0% by mass to 10.0% by mass with respect to the total mass of the ink composition.

In a case where the content thereof is 5.0% by mass or greater, the concealability of the image is further improved.

In a case where the content thereof is 10.0% by mass or less, the jetting stability of the ink composition can be further improved, and it is also advantageous in that the generation of precipitates in a low temperature environment is suppressed.

From the viewpoints of the concealability of an image to be obtained and the alcohol resistance, the content of the resin particles contained in the ink composition is preferably 1% by mass or greater and more preferably 3% by mass or greater with respect to the total mass of the ink composition according to the embodiment of the present disclosure.

Further, from the viewpoint of the jetting stability, the content thereof is preferably 10% by mass or less and more preferably 7% by mass or less.

Examples of the resin of the resin particles in the present disclosure include the following resins. Further, the proportion of each constitutional unit in the following formula is on a mass basis.

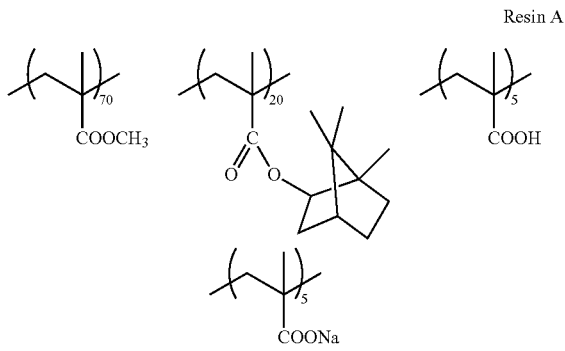

Resin A

<Other Additives>

The ink composition may contain components other than the components described above.

Examples of other components include known additives such as a fading inhibitor, an emulsion stabilizer, a penetration enhancer, an ultraviolet absorbing agent, a preservative, an antibacterial agent, a pH adjuster, a surface tension adjuster, an antifoaming agent, a dispersion stabilizer, a rust inhibitor, and a chelating agent.

<Physical Properties of Ink Composition>

From the viewpoint of the dispersion stability, the pH of the ink composition according to the embodiment of the present disclosure is preferably in a range of 4 to 10, more preferably in a range of 5 to 9, and still more preferably in a range of 5.5 to 8.5.

In the present disclosure, the pH can be measured using a pH meter. For example, the pH can be measured using a pH meter (Toa DKK pH meter HM-20J, manufactured by Tokyo Garasu Kikai Co., Ltd.) in a temperature environment of 25° C.

The viscosity of the ink composition according to the embodiment of the present disclosure is preferably in a range of 1 mPa·s to 30 mPa·s and more preferably in a range of 1.5 mPa·s to 20 mPa·s.

In the present disclosure, the viscosity is measured under conditions of a measurement temperature of 23° C. and a shear rate of 1,400 $s^{-1}$ using a TV-20 type viscometer (manufactured by Toki Sangyo Co., Ltd.) as a measuring device, unless otherwise specified.

The surface tension of the ink composition according to the embodiment of the present disclosure is preferably in a range of 20 mN/m to 60 mN/m, more preferably in a range of 20 mN/m to 45 mN/m, and still more preferably in a range of 25 mN/m to 40 mN/m.

In the present disclosure, the surface tension thereof is measured under a temperature condition of 25° C. using an Automatic Surface Tensiometer CBVP-Z (manufactured by Kyowa Interface Science Co., Ltd.) according to a plate method, unless otherwise specified.

<<Ink Set>>

The ink set according to the embodiment of the present disclosure contains the ink composition described in the present disclosure and a colored ink composition containing water and a colorant. The ink composition described in the present disclosure is as described above.

<Colored Ink Composition>

The colored ink composition according to the embodiment of the present disclosure contains a colorant. In this manner, a desired image can be recorded. It is preferable that the colored ink composition is a color ink composition, a metallic ink composition, or a black ink composition. It is preferable that the colored ink composition does not contain titanium dioxide.

(Colorant)

The colorant in the present disclosure will be described in detail.

As the colorant in the present disclosure, known dyes, pigments, and the like can be used without particular limitation. Among these, from the viewpoint of the ink colorability, a colorant that is almost insoluble or hardly soluble in water is preferable. Specific examples thereof include various pigments, dispersed dyes, oil-soluble dyes, and coloring agents that form J-aggregates. Further, pigments are more preferable from the viewpoint of the light fastness. As the colorant, a colorant other than the titanium dioxide is preferable.

The pigment used in the present disclosure is not particularly limited and can be appropriately selected depending on the purpose. For example, any of an organic pigment or an inorganic pigment may be used as the pigment.

Examples of the organic pigment include an azo pigment, a polycyclic pigment, a chelate dye, a nitro pigment, a nitroso pigment, and aniline black. Among these, an azo pigment and a polycyclic pigment are more preferable. Examples of the azo pigment include azo lake, an insoluble azo pigment, a condensed azo pigment, and a chelated azo pigment. Examples of the polycyclic pigment include a phthalocyanine pigment, a perylene pigment, a perinone pigment, an anthraquinone pigment, a quinacridone pigment, a dioxazine pigment, an indigo pigment, a thioindigo pigment, an isoindolinone pigment, and a quinophthalone pigment. Examples of the chelate dye include a basic dye-type chelate and an acid dye-type chelate.

Examples of the inorganic pigment include iron oxide, calcium carbonate, barium sulfate, aluminum hydroxide, yellow barium, cadmium red, chrome yellow, and carbon black. Among these, carbon black is particularly preferable. Examples of the carbon black include those produced by known methods such as a contact method, a furnace method, and a thermal method.

Specific examples of the carbon black include Raven 7000, Raven 5750, Raven 5250, Raven 5000 ULTRAII, Raven 3500, Raven 2000, Raven 1500, Raven 1250, Raven 1200, Raven 1190 ULTRAll, Raven 1170, Raven 1255, Raven 1080, Raven 1060, and Raven 700 (all manufactured by Colombian Carbon Company), Regal 400R, Regal 330R, Regal 660R, Mogul L, Black Pearls L, Monarch 700, Monarch 800, Monarch 880, Monarch 900, Monarch 1000, Monarch 1100, Monarch 1300, and Monarch 1400 (manufactured by Cabot Corporation), Color black FW1, Color Black FW2, Color Black FW2V, Color Black 18, Color Black FW200, Color Black S150, Color Black S160, Color Black S170, Printex35, Printex U, Printex V, Printex140U, Printex140V, Special Black 6, Special Black 5, Special Black 4A, and Special Black 4 (manufactured by Orion Engineered Carbons Co., Ltd.), No. 25, No. 33, No. 40, No. 45, No. 47, No. 52, No. 900, No. 2200B, No. 2300, MCF-88, MA600, MA7, MA8, and MA100 (all manufactured by Mitsubishi Chemical Corporation), and COLOUR BLACK FW182 (manufactured by Orion Engineered Carbons Co., Ltd.), but the present disclosure is not limited thereto.

Examples of the organic pigment that can be used in the present disclosure include pigments of yellow ink, such as C. I. Pigment Yellow 1, 2, 3, 4, 5, 6, 7, 10, 11, 12, 13, 14, 14C, 16, 17, 24, 34, 35, 37, 42, 53, 55, 65, 73, 74, 75, 81, 83, 93, 95, 97, 98, 100, 101, 104, 108, 109, 110, 114, 117, 120, 128, 129, 138, 150, 151, 153, 154, 155, and 180. Among these, a pigment having an azo skeleton is preferable, and C. I. Pigment Yellow 74 is the most preferable particularly from the viewpoints of the availability and the cost.

Further, examples thereof include pigments of magenta ink, such as C. I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 48 (Ca), 48 (Mn), 48:2, 48:3, 48:4, 49, 49:1, 50, 51, 52, 52:2, 53:1, 53, 55, 57 (Ca), 57:1, 60, 60:1, 63:1, 63:2, 64, 64:1, 81, 83, 87, 88, 89, 90, 101 (red iron oxide), 104, 105, 106, 108 (cadmium red), 112, 114, 122 (quinacridone magenta), 123, 146, 149, 163, 166, 168, 170, 172, 177, 178, 179, 184, 185, 190, 193, 202, 209, 219, 269; and C. I. Pigment Violet 19. Among these, a pigment having a quinacridone skeleton is preferable, and C. I. Pigment Red 122 is most preferable.

Further, examples thereof include pigments of cyan ink, such as C.I. Pigment Blue 1, 2, 3, 15, 15:1, 15:2, 15:3, 15:34, 16, 17:1, 22, 25, 56, 60; C. I. Vat Blue 4, 60, and 63. Among these, C.I. Pigment Blue 15:3 is particularly preferable.

The above-described pigments may be used alone or a plurality of pigments selected from each group or between each group may be used in combination.

From the viewpoints of the ink colorability, the storage stability, and the like, the content of the colorant in the colored ink composition is preferably in a range of 0.1% to 20% by mass, more preferably in a range of 0.2% to 15% by mass, and particularly preferably in a range of 0.5% to 10% by mass with respect to the total mass of the colored ink composition.

<Second Dispersant>

The colored ink composition according to the embodiment of the present disclosure may include a dispersant (hereinafter, the dispersant contained in the colored ink composition is also referred to as a second dispersant).

The second dispersant is not particularly limited, and those exemplified as the first dispersant above can be used.

—Acid Value—

It is preferable that the acid value of the second dispersant is larger than the acid value of the first dispersant and more preferable that the acid value of at least one second dispersant contained in the colored ink composition is greater than 50 mgKOH/g. In this manner, the aggregating property of the colorant in the colored ink composition is further improved.

From the same viewpoint as described above, the acid value of at least one second dispersant is more preferably 60 mgKOH/g or greater and still more preferably 75 mgKOH/g or greater.

Further, from the same viewpoint as described above, the acid value of at least one second dispersant is preferably 200 mgKOH/g or less and more preferably 160 mgKOH/g or less.

The acid value of the second dispersant can be measured by the method described above.

The weight-average molecular weight of the second dispersant is preferably in a range of 10000 to 50000.

In a case where the weight-average molecular weight thereof is 10000 or greater, the amount of water-soluble components can be effectively suppressed. Further, in a case where the weight-average molecular weight thereof is 50000 or less, the dispersibility can be enhanced.

From the same viewpoint as described above, the weight-average molecular weight of the first dispersant is more preferably in a range of 15000 to 45000 and still more preferably in a range of 20000 to 40000.

Further, the weight-average molecular weight of the second dispersant can be measured by the method described above.

(Water)

The colored ink composition contains water.

As water, for example, ion exchange water, distilled water, or the like can be used.

The content of water is preferably in a range of 50% by mass to 90% by mass and more preferably in a range of 60% by mass to 80% by mass with respect to the total mass of the colored ink composition.

<Other Additives>

The colored ink composition may contain components other than the components described above.

Examples of other components include known additives such as a fading inhibitor, an emulsion stabilizer, a penetration enhancer, an ultraviolet absorbing agent, a preservative, an antibacterial agent, a pH adjuster, a surface tension adjuster, an antifoaming agent, a viscosity adjuster, a dispersion stabilizer, a rust inhibitor, and a chelating agent.

<Physical Properties of Colored Ink Composition>

From the viewpoint of the aggregating property of the colored ink composition, the pH of the colored ink composition according to the embodiment of the present disclosure is preferably in a range of 6 to 12, more preferably in a range of 7 to 11, and still more preferably in a range of 7 to 9.

Further, the pH of the colored ink composition according to the embodiment of the present disclosure can be measured by the same method as the method for the ink composition described above.

In the ink set according to the embodiment of the present disclosure, the value obtained by subtracting the pH of the ink composition from the pH of the colored ink composition is preferably in a range of 0.4 to 2.0.

In a case where the value obtained by subtracting the pH of the ink composition from the pH of the colored ink composition is 0.4 or greater, the aggregating property can be further improved.

In a case where the value obtained by subtracting the pH of the ink composition from the pH of the colored ink composition is 2.0 or less, the adhesiveness between a layer formed of the ink composition and a layer formed of the colored ink composition can be improved.

The viscosity of the colored ink composition according to the embodiment of the present disclosure is preferably in a range of 1 mPa·s to 30 mPa·s and more preferably in a range of 1.5 mPa·s to 20 mPa·s.

The surface tension of the colored ink composition according to the embodiment of the present disclosure is preferably in a range of 20 mN/m to 60 mN/m, more preferably in a range of 20 mN/m to 45 mN/m, and still more preferably in a range of 25 mN/m to 40 mN/m.

<<Image Recording Method>>

An image recording method according to the embodiment of the present disclosure includes an ink applying step of applying the ink composition according to the embodiment of the present disclosure onto a base material, and a colored ink applying step of applying the colored ink composition containing water and a colorant onto the base material.

In the image recording method according to the embodiment of the present disclosure, the colored ink applying step may be performed after the ink applying step is performed, the ink applying step may be performed after the colored ink applying step is performed, or the ink applying step and the colored ink applying step may be simultaneously performed by an ink jet method. Among these, in the image recording method according to the embodiment of the present disclosure, it is preferable that the colored ink applying step described below is performed after the ink applying step is performed on the base material.

That is, the image recording method according to the embodiment of the present disclosure includes the step of applying the ink composition onto the surface of the base material before the step of applying the colored ink composition thereto, and it is preferable that the step of applying the colored ink composition onto the surface of the base material is a step of applying the colored ink composition to at least a part of a region on the surface of the base material, to which the ink composition has been applied, using the ink jet method.

Hereinafter, each step of the image recording method according to the embodiment of the present disclosure will be described.

It is preferable that the ink composition according to the embodiment of the present disclosure is used for ink jet recording and also preferable that the image recording method according to the embodiment of the present disclosure includes a step of applying the ink composition according to the embodiment of the present disclosure onto the surface of the base material using an ink jet method.

The image recording method according to the embodiment of the present disclosure may include other steps as necessary.

<Ink Applying Step>

The ink applying step in the present disclosure is a step of applying the ink composition in the ink set according to the embodiment of the present disclosure onto the base material.

The application of the ink composition is not particularly limited as long as the ink composition is applied onto the base material. For example, the ink composition may be applied onto the surface of the base material so as to come into contact with the base material or may be applied so as to come into contact with at least a part of the region on the surface of the base material to which the colored ink composition described below has been applied.

The application of the ink composition onto the base material can be performed by applying a known method such as a coating method, an ink jet method, or an immersion method.

Examples of the coating method include known coating methods using a bar coater (such as a wire bar coater), an extrusion die coater, an air doctor coater, a blade coater, a rod coater, a knife coater, a squeeze coater, a reserve roll coater, a gravure coater, or a flexo coater.

As the ink jet method in the method of applying the ink composition, a known ink jet method can be applied.

The method of jetting the ink composition in the ink jet method is not particularly limited, and any of known methods such as an electric charge control method of jetting an ink composition using an electrostatic attraction force; a drop-on-demand method (pressure pulse method) using a vibration pressure of a piezoelectric element; an acoustic ink jet method of jetting an ink composition using a radiation pressure by converting an electric signal into an acoustic beam and irradiating the ink composition with the acoustic beam; and a thermal ink jet (bubble jet (registered trademark)) method of heating an ink composition to form bubbles and utilizing the generated pressure may be used.

As the ink jet method, particularly, an ink jet method described in JP1979-059936A (JP-S54-059936A) in which an ink composition is jetted from a nozzle using an action force caused by a rapid change in volume of the ink composition after being subjected to an action of thermal energy can be effectively used.

Further, the method described in paragraphs 0093 to 0105 of JP2003-306623A can also be applied as the ink jet method.

The application of the ink composition according to the ink jet method is performed by allying the ink composition to be jetted from a nozzle of an ink jet head.

Examples of the system of the ink jet head include a shuttle system of performing recording while scanning a short serial head in the width direction of the base material and a line system of using a line head in which recording elements are aligned in correspondence with the entire area of one side of the base material.

In the line system, image recording can be performed on the entire surface of the base material by scanning the base material in a direction intersecting the direction in which the recording elements are aligned. In the line system, a transport system such as a carriage that scans a short head in the shuttle system is not necessary. Further, in the line system, since the movement of a carriage and complicated scanning control between the head and the base material are not necessary as compared with the shuttle system, only the base material moves. Therefore, according to the line system, image recording at a higher speed than that of the shuttle system can be realized.

From the viewpoint of obtaining a high-definition image, the liquid droplet amount of the ink composition jetted from the nozzle of the ink jet head is preferably in a range of 1 pL (pico liter) to 10 pL and more preferably in a range of 1.5 pL to 6 pL.

In addition, from the viewpoints of improving the image irregularity and improving connection of continuous gradations, it is also effective that the ink is jetted by combining different amounts of liquid droplets.

Further, the ink jet head may comprise a liquid-repellent film on the surface to which the ink composition is jetted (ink jetted surface). Examples of the liquid-repellent film include those described in paragraphs 0178 to 0184 of JP2016-193980A.

The mass (g/m$^2$) of the ink composition to be applied per unit area is not particularly limited as long as the components in the ink composition can be aggregated, but is preferably in a range of 0.1 g/m$^2$ to 10 g/m$^2$, more preferably in a range of 0.5 g/m$^2$ to 6.0 g/m$^2$, and still more preferably in a range of 1.0 g/m$^2$ to 4.0 g/m$^2$.

Further, in the ink applying step, the base material may be heated before the application of the ink composition.

The heating temperature may be appropriately set according to the kind of the base material, the composition of the ink composition, and the like, but the temperature of the base material is set to be preferably in a range of 20° C. to 50° C. and more preferably in a range of 25° C. to 40° C.

The image recording method may include a drying step of heating and drying the ink composition applied after the ink applying step and before the colored ink applying step described below.

Examples of the means for heating and drying the ink composition include known heating means such as a heater, known air blowing means such as a dryer, and means for combining these.

Examples of the method for heating and drying the ink composition include a method of applying heat using a heater or the like from a side of the base material opposite to the surface to which the ink composition has been applied; a method of applying warm air or hot air to the surface of the base material to which the ink composition has been applied; a method of applying heat using an infrared heater from the surface of the base material to which the ink composition has been applied or from a side of the base material opposite to the surface to which the ink composition has been applied; and a method of combining a plurality of these methods.

The heating temperature of heating and drying the treatment liquid is preferably 35° C. or higher and more preferably 40° C. or higher.

The upper limit of the heating temperature is not particularly limited, and the upper limit thereof is preferably 100° C., more preferably 90° C., and still more preferably 70° C.

The time of heating and drying the treatment liquid is not particularly limited, but is preferably in a range of 0.5 seconds to 60 seconds, more preferably in a range of 0.5 seconds to 20 seconds, and particularly preferably in a range of 0.5 seconds to 10 seconds.

<Colored Ink Applying Step>

The colored ink applying step is a step of applying the colored ink composition in the ink set according to the embodiment of the present disclosure onto the base material.

The application of the colored ink composition is not particularly limited as long as the colored ink composition is applied onto the base material. For example, the colored ink composition may be applied onto the surface of the base material so as to come into contact with the base material or may be applied so as to come into contact with at least a part of a region on the surface of the base material, to which the ink composition has been applied in the ink applying step described above.

The colored ink applying step performed using the ink jet method is the same as the step of applying the ink composition onto the base material except that the colored ink composition is used, and the preferred embodiments thereof are the same as described above.

The colored ink composition can be selectively applied onto the base material by performing the above-described step. In this manner, a desired image (specifically, a visible image) can be recorded.

In the colored ink applying step, only one kind of the colored ink composition according to the embodiment of the present disclosure or two or more kinds of the colored ink compositions according to the embodiment of the present disclosure may be applied.

As the method of applying the colored ink composition in the colored ink applying step, a known ink jet method can be applied.

The details of the ink jet method are the same as the details of the ink jet method which can be applied to the ink applying step described above.

In the colored ink applying step, the applied colored ink composition may be heated and dried.

Examples of the means for heating and drying the ink composition include known heating means such as a heater, known air blowing means such as a dryer, and means for combining these.

Examples of the method for heating and drying the colored ink composition include a method of applying heat using a heater or the like from a side of the base material opposite to the surface to which the colored ink composition has been applied; a method of applying warm air or hot air to the surface of the base material to which the colored ink composition has been applied; a method of applying heat using an infrared heater from the surface of the base material to which the colored ink composition has been applied or from a side of the base material opposite to the surface to which the colored ink composition has been applied; and a method of combining a plurality of these methods.

The heating temperature of heating and drying the ink composition is preferably 55° C. or higher, more preferably 60° C. or higher, and particularly preferably 65° C. or higher.

The upper limit of the heating temperature is not particularly limited, and the upper limit thereof is preferably 100° C. and more preferably 90° C.

The time of heating and drying the colored ink composition is not particularly limited, but is preferably in a range of 3 seconds to 60 seconds, more preferably in a range of 5 seconds to 60 seconds, and particularly preferably in a range of 10 seconds to 45 seconds.

Further, in the colored ink applying step, the base material (or the base material to which the colored ink composition has been applied in the colored ink applying step) may be heated before the application of the colored ink composition.

The heating temperature may be appropriately set according to the kind of the base material, the composition of the colored ink composition, and the like, but the temperature of the base material is set to be preferably in a range of 20° C. to 50° C. and more preferably in a range of 25° C. to 40° C.

[Base Material]

The base material used in the image recording method according to the embodiment of the present disclosure is not particularly limited, and examples thereof include paper, coated paper, a resin base material, a metal, a ceramic, glass, and a textile base material.

In the image recording method according to the present disclosure, it is also preferable to use an impermeable base material because an image with excellent concealability can be obtained.

In the present disclosure, the "impermeable base material" indicates a base material that absorbs less water or does not absorb water. Specifically, the "impermeable base material" indicates a base material having a water absorption amount of 0.3 g/m$^2$ or less.

The water absorption amount (g/m$^2$) of the base material is measured as follows.

Water is brought into contact with a region having a size of 100 mm×100 mm in the front surface of the base material (that is, the surface to which an image is recorded), and the state is maintained at 25° C. for 1 minute. The mass (absorption amount (g)) of water absorbed by maintaining the state for 1 minute is acquired, and the obtained absorption amount (g) is converted to the absorption amount per unit area (g/m$^2$).

The impermeable base material is not particularly limited, but a resin base material is preferable.

The resin base material is not particularly limited, and examples thereof include a base material formed of a thermoplastic resin.

A base material obtained by molding a thermoplastic resin in the form of a sheet is exemplified as the resin base material.

It is preferable that the resin base material contains polypropylene, polyethylene terephthalate, nylon, polyethylene, or polyimide.

The resin base material may be a transparent resin base material or a colored resin base material, and at least a part thereof may be subjected to a metal vapor deposition treatment or the like.

In the present disclosure, the term "transparent" indicates that the minimum transmittance at a wavelength of 400 nm to 700 nm at 23° C. is 80% or greater (preferably 90% or greater and more preferably 95% or greater). The minimum transmittance is measured in every 1 nm using a spectrophotometer (for example, spectrophotometer UV-2100, manufactured by Shimadzu Corporation).

The shape of the resin base material is not particularly limited, but a sheet-shaped resin base material is preferable. From the viewpoint of the productivity of the image recorded material, a sheet-shaped resin base material which is capable of forming a roll by being wound is more preferable.

The thickness of the resin base material is preferably in a range of 10 μm to 200 μm and more preferably in a range of 10 μm to 100 μm.

EXAMPLES

Hereinafter, the present invention will be described in more detail based on examples, but the present invention is not limited to the following examples unless the gist thereof is overstepped. Further, "parts" are on a mass basis unless otherwise specified.

In the present example, the acid value, the average particle diameter, and the weight-average molecular weight were measured by the methods described above.

Examples 1 to 19 and Comparative Examples 1 to 3

<Preparation of Pigment Dispersion>

Each dispersant listed in Table 1, water, and particles of titanium dioxide were mixed according to the composition of the following pigment dispersion, thereby obtaining a mixed solution. Next, each of the mixed solutions was subjected to a dispersion treatment for 1.5 hours using LABOSTAR Mini LMZ015 (manufactured by Ashizawa Finetech Ltd., bead diameter: 0.1 mmφ, zirconia beads, rotation speed: 10 m/sec), thereby obtaining each pigment dispersion (solid content of pigment: 50% by mass).

[Composition of Pigment Dispersion]
  Titanium dioxide particles listed in Table 1: 500 parts by mass
  Dispersant listed in Table 1: the amount corresponding to the content of the dispersant listed in Table 1 (with respect to % by mass of titanium dioxide).
  Water-soluble solvent listed in Table 1: 100 parts by mass
  Water: the remainder set such that the total amount of the composition reaches 1000 parts by mass <Preparation of Ink Composition>

The respective components were mixed so as to have the composition shown below, and the mixture was stirred at room temperature (25° C.) for 1 hour, thereby obtaining an ink composition used in each example or each comparative example.

The numerical values of the contents listed in Table 1 and parts by mass in the following composition indicate % by mass of the solid content of each compound in a case where the total mass of the ink composition was set to 100 parts by mass. Here, the contents of the dispersant and the metal oxide particles show % by mass in a case where the total mass of the titanium dioxide is set to 100% by mass.

[Composition]
  Each pigment dispersion: 14 parts by mass
  Metal oxide particles listed in Table 1: the amount corresponding to the amount listed in Table 1
  Water-soluble solvent listed in Table 1: the amount corresponding to the amount listed in Table 1
  OLFINE Exp. 4200 (manufactured by Nissin Chemical Industry Co., Ltd., surfactant): 1 part by mass
  Resin A (resin particles, acrylic latex, solid content of 23% by mass): 4.0 parts by mass
  Ion exchange water: the amount set such that the total amount of the composition reaches 100 parts by mass <Synthesis Method of Resin A>

A 2 L three-neck flask provided with a mechanical stirrer, a thermometer, a reflux cooling pipe, and a nitrogen gas introduction pipe was charged with methyl ethyl ketone (540.0 g), and the methyl ethyl ketone was heated to 75° C. A mixed solution formed of methyl methacrylate (378.0 g), isobornyl methacrylate (108 g), methacrylic acid (54.0 g), methyl ethyl ketone (108 g), and "V-601" (manufactured by FUJIFILM Wako Pure Chemical Corporation) (2.1 g) was added dropwise to the methyl ethyl ketone at a constant speed such that the dropwise addition was completed in 2 hours while the temperature in the reaction container was maintained at 75° C. After the completion of the dropwise addition, a solution formed of "V-601" (1.15 g) and methyl ethyl ketone (15.0 g) was added thereto, and the resulting solution was stirred at 75° C. for 2 hours. Further, a solution formed of "V-601" (0.54 g) and methyl ethyl ketone (15.0 g) was added thereto, and the resulting solution was stirred at 75° C. for 2 hours. Thereafter, the solution was heated to 85° C. and continuously stirred temperature for 2 hours, thereby obtaining a resin solution of a copolymer of methyl methacrylate, isobornyl methacrylate, and methacrylic acid (=70/20/10 [mass ratio]).

The weight-average molecular weight (Mw) of the obtained copolymer was 60000, the acid value thereof was 54.2 mgKOH/g, and the glass transition temperature thereof was 124° C.

Next, the resin solution (588.2 g) was weighed, isopropanol (165 g) and a 1 mol/L sodium hydroxide aqueous solution (120.8 ml) were added thereto, and the temperature in the reaction container was increased to 80° C. Next, distilled water (718 g) was added dropwise thereto at a speed of 20 ml/min, to carry out dispersion in water. Next, the temperature in the reaction container was maintained at 80° C. for 2 hours, 85° C. for 2 hours, and 90° C. for 2 hours under the atmospheric pressure, and the solvent was distilled off. Further, the pressure inside the reaction container was reduced, and isopropanol, methyl ethyl ketone, and distilled water were distilled off, thereby obtaining a resin A (an aqueous dispersion having a solid content of 25.0% by mass).

Comparative Example 4

<Preparation of Sintered Body of Zirconium Dioxide-Containing Titanium Dioxide Powder>

120 g of a titanium chloride solution (manufactured by FUJIFILM Wako Pure Chemical Corporation, Ti: approximately 15% by mass) was added to 4000 ml of ion exchange water, and the resulting solution was stirred at a temperature of 70° C. After 1 hour, a bluish titanium dioxide colloidal aqueous solution was obtained.

15.6 g of a zirconium chloride oxide octahydrate was added to the colloidal solution, the temperature of the colloidal aqueous solution was maintained at 70° C., and the solution was stirred for 1 hour. As a result, a bluish white sol liquid was obtained. The colloidal aqueous solution was washed by ion dialysis so that the pH thereof reached around 2.5, thereby obtaining an aqueous dispersion of zirconium dioxide-containing titanium dioxide nanoparticles whose concentration of solid contents was 6% by mass.

The aqueous dispersion of zirconium dioxide-containing titanium dioxide nanoparticles whose concentration of solid contents was 6% by mass was poured into a spray dryer device, pressurized (0.2 MPa) at a nozzle outlet temperature of 200° C., and sprayed and dried, thereby obtaining zirconium dioxide-containing titanium dioxide powder. The obtained powder was heated to 500° C. from room temperature at a speed of 5° C. per minute in an air atmosphere using an electric furnace and further burned at 500° C. for 2 hours, thereby obtaining a sintered body of zirconium dioxide-containing titanium dioxide powder (hereinafter, also referred to as a zirconium dioxide-containing titanium dioxide sintered body). The obtained zirconium dioxide-containing titanium dioxide sintered body was particles of a composite oxide of titanium dioxide and zirconium dioxide, in which zirconium dioxide was omnipresent on the surface side in each particle.

<Preparation of Dispersion of Zirconium Dioxide-Containing Titanium Dioxide Sintered Body>

150 parts of a dispersant P-1 was dissolved in water to prepare an aqueous solution of the dispersant using a potassium hydroxide aqueous solution such that the pH after neutralization was set to 9 and the concentration of the dispersant was set to approximately 25% by mass.

Further, each component was mixed according to the composition shown below, thereby obtaining a mixed solution.

Next, the mixed solution was subjected to a dispersion treatment for 1.5 hours using LABOSTAR Mini LMZ015 (manufactured by Ashizawa Finetech Ltd., bead diameter: 0.1 mmφ, zirconia beads), thereby obtaining a dispersion of the zirconium dioxide-containing titanium dioxide sintered body used to prepare the ink composition of Comparative Example 4.

[Composition of Dispersion of Zirconium Dioxide-Containing Titanium Dioxide Sintered Body]

Aqueous solution of dispersant P-1: 30 parts by mass
Zirconium dioxide-containing titanium dioxide sintered body: 500 parts by mass
Propylene glycol (PG): 100 parts by mass
Ion exchange water: the remainder set such that the total amount of the composition reaches 1000 parts by mass <Preparation of Ink Composition>

In Comparative Example 4, the respective components were mixed so as to have the composition shown below, and the mixture was stirred at room temperature for 1 hour, thereby obtaining an ink composition used in Comparative Example 4.

The numerical values of the contents listed in Table 2 and parts by mass in the following composition indicate % by mass of the solid content of each compound in a case where the total mass of the ink composition is set to 100% by mass. However, the contents of the zirconium dioxide and the dispersant show % by mass in a case where the total mass of the titanium dioxide is set to 100% by mass.

[Composition]

Dispersion of zirconium dioxide-containing titanium dioxide sintered body: 14 parts by mass
Water-soluble solvent listed in Table 2: the amount listed in Table 2
Resin A (resin particles, acrylic latex, solid content of 23% by mass): 4.0 parts by mass
OLFINE Exp. 4200 (manufactured by Nissin Chemical Industry Co., Ltd., surfactant): 1 part by mass
Ion exchange water: the amount set such that the total amount of the composition reaches 100 parts by mass

TABLE 1

| | Ink composition | | | | | | | | | |
|---|---|---|---|---|---|---|---|---|---|---|
| | Titanium dioxide particles | | | Dispersant | | | Metal oxide particles | | Water-soluble solvent | |
| | Type | Average particle diameter [nm] | Surface treatment | Type | Acid value (mg KOH/g) | Content [% by mass] (with respect to titanium dioxide) | Type | Average particle diameter [nm] | Content [% by mass] (with respect to titanium dioxide) | Type | Content [% by mass] (with respect to ink composition) |
| Example 1 | TiO$_2$-1 | 210 | SiO$_2$/Al$_2$O$_3$/organic matter | P-1 | 14 | 1.5% | ZrO$_2$-1 | 55 | 18.5% | PG | 28% |
| Example 2 | TiO$_2$-1 | 210 | SiO$_2$/Al$_2$O$_3$/organic matter | P-2 | 10 | 10% | ZrO$_2$-1 | 55 | 18.5% | PG | 28% |
| Example 3 | TiO$_2$-1 | 210 | SiO$_2$/Al$_2$O$_3$/organic matter | P-3 | 64 | 1.5% | ZrO$_2$-1 | 55 | 18.5% | PG | 28% |
| Example 4 | TiO$_2$-1 | 210 | SiO$_2$/Al$_2$O$_3$/organic matter | P-1 | 14 | 1.5% | ZrO$_2$-1 | 55 | 40% | PG | 28% |

TABLE 1-continued

| | Titanium dioxide particles | | | Dispersant | | | Metal oxide particles | | | Water-soluble solvent | |
|---|---|---|---|---|---|---|---|---|---|---|---|
| | Type | Average particle diameter [nm] | Surface treatment | Type | Acid value (mg KOH/g) | Content [% by mass] (with respect to titanium dioxide) | Type | Average particle diameter [nm] | Content [% by mass] (with respect to titanium dioxide) | Type | Content [% by mass] (with respect to ink composition) |
| Example 5 | TiO$_2$-1 | 210 | SiO$_2$/Al$_2$O$_3$/organic matter | P-1 | 14 | 1.5% | Al$_2$O$_3$-1 | 13 | 18.5% | PG | 28% |
| Example 6 | TiO$_2$-1 | 210 | SiO$_2$/Al$_2$O$_3$/organic matter | P-1 | 14 | 1.5% | SiO$_2$-1 | 40 | 18.5% | PG | 28% |
| Example 7 | TiO$_2$-1 | 210 | SiO$_2$/Al$_2$O$_3$/organic matter | P-1 | 14 | 1.5% | ZrO$_2$-1 | 55 | 18.5% | PG | 2.6% |
| Example 8 | TiO$_2$-1 | 210 | SiO$_2$/Al$_2$O$_3$/organic matter | P-1 | 14 | 1.5% | ZrO$_2$-1 | 55 | 18.5% | PG | 6.4% |
| Example 9 | TiO$_2$-1 | 210 | SiO$_2$/Al$_2$O$_3$/organic matter | P-1 | 14 | 1.5% | ZrO$_2$-1 | 55 | 18.5% | TEGmBE | 6.4% |
| Example 10 | TiO$_2$-1 | 210 | SiO$_2$/Al$_2$O$_3$/organic matter | P-1 | 14 | 1.5% | ZrO$_2$-1 | 55 | 18.5% | PG | 46% |
| Example 11 | TiO$_2$-2 | 210 | Al$_2$O$_3$ | P-1 | 14 | 1.5% | ZrO$_2$-1 | 55 | 18.5% | PG | 28% |
| Example 12 | TiO$_2$-3 | 250 | SiO$_2$/Al$_2$O$_3$ | P-1 | 14 | 1.5% | ZrO$_2$-1 | 55 | 18.5% | PG | 28% |
| Example 13 | TiO$_2$-4 | 250 | Al$_2$O$_3$/Zr | P-1 | 14 | 1.5% | ZrO$_2$-1 | 55 | 18.5% | PG | 28% |
| Example 14 | TiO$_2$-5 | 280 | SiO$_2$/Al$_2$O$_3$/organic matter | P-1 | 14 | 1.5% | ZrO$_2$-1 | 55 | 18.5% | PG | 28% |
| Example 15 | TiO$_2$-1 | 210 | SiO$_2$/Al$_2$O$_3$/organic matter | P-1 | 14 | 1.5% | ZrO$_2$-2 | 15 | 18.5% | PG | 28% |
| Example 16 | TiO$_2$-1 | 210 | SiO$_2$/Al$_2$O$_3$/organic matter | P-1 | 14 | 1.5% | ZrO$_2$-3 | 15 | 18.5% | PG | 28% |
| Example 17 | TiO$_2$-1 | 210 | SiO$_2$/Al$_2$O$_3$/organic matter | P-1 | 14 | 1.5% | ZrO$_2$-4 | 15 | 18.5% | PG | 28% |
| Example 18 | TiO$_2$-1 | 210 | SiO$_2$/Al$_2$O$_3$/organic matter | P-1 | 14 | 1.5% | Fe$_2$O$_3$-1 | 20 | 18.5% | PG | 28% |
| Example 19 | TiO$_2$-1 | 210 | SiO$_2$/Al$_2$O$_3$/organic matter | P-1 | 14 | 1.5% | ZnO-1 | 21 | 18.5% | PG | 28% |
| Comparative Example 1 | TiO$_2$-6 | 80 | Al(OH)$_3$ | P-1 | 14 | 1.5% | ZrO$_2$-1 | 55 | 18.5% | PG | 28% |
| Comparative Example 2 | TiO$_2$-1 | 210 | SiO$_2$/Al$_2$O$_3$/organic matter | P-1 | 14 | 1.5% | TiO$_2$-1 | 35 | 18.5% | PG | 28% |
| Comparative Example 3 | TiO$_2$-1 | 210 | SiO$_2$/Al$_2$O$_3$/organic matter | P-1 | 14 | 1.5% | None | — | None | PG | 28% |

TABLE 2

| | Sintered body of zirconium dioxide-containing titanium dioxide powder | | Dispersant | | | Water-soluble solvent | |
|---|---|---|---|---|---|---|---|
| | Average particle diameter [nm] | Content of zirconium dioxide (with respect to titanium dioxide) | Type | Acid value (mg KOH/g) | Content [% by mass] (with respect to titanium dioxide) | Type | Content [% by mass] (with respect to ink composition) |
| Comparative Example 4 | 210 | 18.5% | P-1 | 14 | 1.5% | PG | 26% |

The details of each component listed in Table 1 and Table 2 are as follows.

TiO$_2$-1: PF690 (titanium dioxide, manufactured by Ishihara Sangyo Kaisha, Ltd.)

TiO$_2$-2: CR60 (titanium dioxide, manufactured by Ishihara Sangyo Kaisha, Ltd.)

TiO$_2$-3: CR90 (titanium dioxide, manufactured by Ishihara Sangyo Kaisha, Ltd.)

TiO$_2$-4: CR97 (titanium dioxide, manufactured by Ishihara Sangyo Kaisha, Ltd.)

TiO$_2$-5: CR95 (titanium dioxide, manufactured by Ishihara Sangyo Kaisha, Ltd.)

TiO$_2$-6: TTO-55 (B) (titanium dioxide, manufactured by Ishihara Sangyo Kaisha, Ltd.)

ZrO$_2$-1: ZSL00014 (zirconium dioxide, manufactured by Daiichi Kigenso Kagaku Kogyo Co., Ltd.)

ZrO$_2$-2, ZrO$_2$-3, and ZrO$_2$-4: the following zirconium dioxide dispersion obtained by the method described below Al$_2$O$_3$-1: AEROXIDE (aluminum oxide, manufactured by EVONIK Industries AG)

SiO$_2$-1: AEROSIL (silicon dioxide, manufactured by EVONIK Industries AG)

Fe$_2$O3-1: iron oxide (II, III) magnetic nanoparticle solution #747327 (diiron trioxide, manufactured by Sigma-Aldrich Co. LLC)

ZnO: FZO-50 (zinc oxide, manufactured by Ishihara Sangyo Kaisha, Ltd.)

P-1: ARON (registered trademark) A6330 (sodium polycarboxylate salt, manufactured by Toagosei Co., Ltd.)

P-2: BYK190 (sodium polycarboxylate salt, manufactured by BYK Chemie Japan KK)

P-3: a compound synthesized by the method described below

PG: propylene glycol

TEGmBE: triethylene glycol monobutyl ether

<Synthesis of Dispersant P-3>

The dispersant P-3 was synthesized in the following manner.

605 g of dipropylene glycol was added to a three-neck flask provided with a stirrer and a cooling pipe and heated to 85° C. in a nitrogen atmosphere.

A solution I obtained by mixing 234 g of benzyl methacrylate, 120 g of stearyl methacrylate, 60 g of methacrylic acid, 186 g of hydroxyethyl methacrylate, and 3.93 g of 2-mercaptopropionic acid and a solution II obtained by dissolving 6.2 g of t-butylperoxy-2-ethylhexanoate (Perbutyl O, manufactured by NOF Corporation) in 115 g of dipropylene glycol were respectively prepared. The solution I was added dropwise to the three-neck flask for 4 hours, and the solution II was added dropwise thereto for 5 hours.

After the completion of the dropwise addition, the resulting solution was allowed to further react for 2 hours, heated to 95° C., and heated and stirred for 3 hours so that all unreacted monomers were allowed to react. The disappearance of the monomers was confirmed by $^1$H-NMR.

The obtained reaction solution was heated to 70° C., 74 g of dimethylaminoethanol was added thereto as an amine compound, and 764 g of propylene glycol was added thereto, and the resulting solution was stirred, thereby obtaining a solution (solid content: 30% by mass) of the dispersant P-3 having a weight-average molecular weight (Mw) of 30000 and an acid value of 64 mgKOH/g. The constituent components of the obtained polymer were confirmed by $^1$H-NMR.

<Preparation of Zirconium Dioxide Dispersion>

Each dispersion of zirconium dioxide was prepared by the following method using zirconium dioxides ZrO2-2, ZrO2-3, and ZrO2-4 listed in Table 1.

The dispersant, water, and zirconium powder were mixed according to the composition of the following pigment dispersion, thereby obtaining a mixed solution. Next, the mixed solution was subjected to a dispersion treatment using LABOSTAR Mini LMZ015 (manufactured by Ashizawa Finetech Ltd., bead diameter: 0.1 mmφ, zirconia beads, rotation speed: 10 m/sec), thereby obtaining each dispersion of zirconium dioxide (ZrO2 solid content: 50% by mass).

Further, the average secondary particle diameters of the zirconium dioxides ZrO2-2, ZrO2-3, and ZrO2-4 were respectively adjusted to 165 nm, 130 nm and 80 nm by appropriately changing the duration time of the dispersion treatment. The average secondary particle diameter was measured by diluting the ink composition 2000 times with ultrapure water using a nanotrac particle size distribution measurement apparatus UPA-EX150 (manufactured by Nikkiso Co., Ltd.) according to the dynamic light scattering method. Further, the average value obtained by performing the measurement twice was calculated as the average secondary particle diameter.

The average primary particle diameters of the zirconium dioxides ZrO2-2, ZrO2-3, and ZrO2-4 are listed in Table 1.

[Composition of Zirconium Dioxide Dispersion]

Zirconium powder: UEP-100 (manufactured by Daiichi Kigenso Kagaku Kogyo Co., Ltd.), 80 parts A-6012: (manufactured by Toagosei Co., Ltd.), 40 parts Water: 280 parts (Evaluation Method)

<Filterability>

The filterability of the ink composition used in each example or each comparative example was evaluated and used as an index showing the productivity of the ink composition. The evaluation of the filterability was evaluated by the following method based on the following evaluation standards. The results are listed in Table 3.

250 ml of the ink composition was suction-filtered by placing a housing, in which a filter (Omnipore (registered trademark) membrane, pore diameter: 5 μm, diameter: 47 mmφ, manufactured by Merck KGaA) was set, on an opening of a container and reducing the pressure inside the container to 0.075 MPa, and the time until the entire solution passed through the filter was measured with a stopwatch.

Further, the filtered solution was used as the ink composition used in each example or each comparative example.

—Evaluation Standards—

A: The entire solution passed through the filter after shorter than 50 seconds from the start of suction in a state where the entire ink composition was placed on the filter.

B: The entire solution passed through the filter after 50 seconds or longer and shorter than 100 seconds from the start of suction in a state where the entire ink composition was placed on the filter.

C: The entire solution passed through the filter after 100 seconds or longer and shorter than 150 seconds from the start of suction in a state where the entire ink composition was placed on the filter.

D: The entire solution passed through the filter after 150 seconds or longer from the start of suction in a state where the entire ink composition was placed on the filter.

E: The suction was started in a state where the entire composition was placed on the filter, but the ink composition was clogged in the middle of the suction and was not able to be completely filtered.

<Jettability>

A GELJET (registered trademark) GX5000 printer head (manufactured by Ricoh Co., Ltd.) was prepared. The printer head is a line head in which 96 nozzles are arranged.

The printer head was fixed by being aligned in a direction (main scanning direction) of the line head in which the nozzles were arranged in a direction orthogonal to a moving direction (sub scanning direction) of a stage that was able to move in a predetermined linear direction at 500 mm/sec. Next, the storage tank was filled with the ink composition obtained in the above-described manner.

As a recording medium, Kassai photofinishing Pro (manufactured by FUJIFILM Corporation) was prepared and attached to the stage.

Next, the ink composition prepared in each example or each comparative example was allowed to be jetted to the recording medium from the printer head according to the line system while the recording medium was allowed to move at a constant stage speed of 248 mm/min, thereby preparing a sample 1.

The ink composition was jetted under conditions of an ink droplet amount of 3.4 pL, a jetting frequency of 10 kHz, and a resolution (nozzle arrangement direction×transport direction) of 75 dpi×1200 dpi (dot per inch), 96 lines were arranged parallel to the transport direction, and 2000 ink droplets per one nozzle (one jet hole) were jetted.

The obtained sample was visually observed to confirm that the ink composition was jetted from all the nozzles (jet holes).

After the ink was jetted, the head was allowed to stand as it was in an environment of 25° C. and 80% RH for 3 hours, a new recording medium was attached to the stage, and the ink composition was allowed to be jetted again under the same conditions as described above, thereby preparing a sample 2.

The obtained sample 2 was visually observed, and the jettability was evaluated based on the number of jet failure nozzles according to the following evaluation standards. The results are listed in Table 3.

Further, the jettability in the ink jet method is excellent as the number of jet failure nozzles decreases.

—Evaluation Standards—
A: The number of jet failure nozzles was in a range of 0 to 3.
B: The number of jet failure nozzles was in a range of 4 to 7.
C: The number of jet failure nozzles was in a range of 8 to 11.
D: The number of jet failure nozzles was in a range of 12 to 15.
E: The number of jet failure nozzles was 16 or more.

<Storage Stability>

The storage stability of the ink composition prepared in each example and each comparative example was evaluated and used as an index showing the dispersion stability of the ink compositions.

In regard to the thickening of the ink composition, the viscosity thereof was measured before and after the ink composition was allowed to stand in a sealed state at 50° C. for 336 hours, and the rate of change in viscosity before and after the standing was calculated.

The storage stability was evaluated based on the calculated rate in change according to the following evaluation standards and used as an index of the dispersion stability of titanium dioxide particles. The results are listed in Table 3.

Further, the viscosity was measured at 30° C. using a TV-20 type viscometer (manufactured by Toki Sangyo Co., Ltd.).

—Evaluation Standards—
A: The rate of change in viscosity was less than 1%.
B: The rate of change in viscosity was 1% or greater and less than 6%.
C: The rate of change in viscosity was 6% or greater and less than 15%.
D: The rate of change in viscosity was 15% or greater and less than 25%.
E: The rate of change in viscosity was 25% or greater.

<Water Resistance and Alcohol Resistance>

In the evaluation of water resistance and alcohol resistance, a solid image having a width of 7 mm was prepared as a recorded material according to the same method as the method in the evaluation of the jettability.

Further, color fading was evaluated as water resistance by rubbing the image surface of the recorded material ten times using a cotton swab to which ultrapure water was applied, based on the following evaluation standards.

Further, alcohol resistance was evaluated according to the same method as the method described above except that ultrapure water was changed to ethanol (20 mass % diluent), based on the following evaluation standards. The results are shown in Table 3.

—Evaluation Standards—
A: The image was not color-faded at all.
B: A part of the image was slightly color-faded.
C: A part of the image was more color-faded as compared with B evaluation, but the base material was not visible.
D: A part of the image was partially color-faded, and the base material was visible.
E: The color was entirely faded from the base material.

TABLE 3

| | Evaluation | | | | |
|---|---|---|---|---|---|
| | Storage stability | Filterability | Jettability | Water | Alcohol resistance |
| Example 1 | A | A | A | A | A |
| Example 2 | A | A | A | A | A |
| Example 3 | B | B | B | A | A |
| Example 4 | B | A | A | A | A |
| Example 5 | B | A | A | A | A |
| Example 6 | B | A | A | A | A |
| Example 7 | B | A | B | A | A |
| Example 8 | B | A | B | A | A |
| Example 9 | C | B | B | A | A |
| Example 10 | B | B | A | A | A |
| Example 11 | B | B | A | A | A |
| Example 12 | A | A | A | A | A |
| Example 13 | B | B | A | A | A |
| Example 14 | B | A | A | A | A |
| Example 15 | C | B | B | A | A |
| Example 16 | B | B | B | A | A |
| Example 17 | B | B | B | A | A |
| Example 18 | C | B | B | A | A |
| Example 19 | C | B | B | A | A |
| Comparative Example 1 | E | D | D | E | E |
| Comparative Example 2 | D | D | D | D | D |
| Comparative Example 3 | E | E | E | E | E |
| Comparative Example 4 | E | E | E | E | E |

As listed in Table 3, in Examples 1 to 19, the storage stability was satisfactory.

Among the examples, in Example 1 in which the content of the metal oxide particles was in a range of 0.5% by mass to 35% by mass with respect to the content of the titanium dioxide particles, the storage stability was more excellent as compared with Example 4 in which the content of the metal oxide particles was greater than 35% by mass with respect to the content of the titanium dioxide particles.

In Comparative Example 1 in which the average particle diameter of the titanium dioxide particles was 80 nm, Comparative Example 2 in which titanium dioxide particles were used as the metal oxide particles, and Comparative Example 3 in which metal oxide particles were not used, the storage stability was poor. In Comparative Example 4 in which the zirconium dioxide-containing titanium dioxide sintered body was used, all the storage stability, the filterability, the jettability, the water resistance, and the alcohol resistance were poor.

<Image Visibility>

Each recorded material was prepared using each of the ink compositions of Examples 1 to 19 and Comparative Examples 1 to 4 according to the same method as the method in the evaluation of the water resistance and alcohol resistance. Further, a colored ink composition was prepared by the following method. The colored ink composition was allowed to be jetted to the surface of each recorded material to which the ink composition had been applied while the recorded material was allowed to move at a constant stage speed of 339 mm/min, and the character (unicode: U+9DF9) shown in FIG. 1 was output at 5 pt. The colored ink composition was jetted from the ink jet nozzle according to the line system using the printer head used in the evaluation of the jettability.

Further, the jetting of the colored ink composition was started within 2 seconds after the completion of drying the ink composition.

The colored ink composition was jetted under conditions of an ink droplet amount of 4.0 pL, a jetting frequency of 10 kHz, and a resolution (nozzle arrangement direction×transport direction) of 75 dpi×600 dpi (dot per inch).

The obtained image recorded material was visually observed and the visibility of the image was evaluated by applying light of a 30 W fluorescent lamp to the image recorded material.

<Preparation of Black Pigment Dispersion>

150 parts of the dispersant P-2 was dissolved in water to prepare an aqueous solution of the dispersant P-2 using a potassium hydroxide aqueous solution such that the pH after neutralization was set to 9 and the concentration of the dispersant was set to approximately 25% by mass.

Further, each component was mixed according to the composition shown below, thereby obtaining a mixed solution.

Next, the mixed solution was subjected to a dispersion treatment for 1.5 hours using LABOSTAR Mini LMZ015 (manufactured by Ashizawa Finetech Ltd., bead diameter: 0.1 mmφ, zirconia beads), thereby obtaining each pigment dispersion (solid content of pigment: 15% by mass).

[Composition of Black Pigment Dispersion]

Aqueous solution of dispersant P-2: 280 parts by mass
Pigment: carbon black, 200 parts by mass
Water: the remainder set such that the total amount of the composition reaches 1000 parts by mass <Preparation of Colored Ink Composition>

The respective components were mixed so as to have the composition shown below, and the solution obtained by stirring the mixture at room temperature for 1 hour was used as the colored ink composition.

The description of parts by mass in the following composition indicate % by mass of the solid content of each compound in a case where the total mass of the ink composition is set to 100% by mass.

[Composition]

Black pigment dispersion: 14 parts by mass
Diethylene glycol: 9 parts by mass
Propylene glycol (PG): 26 parts by mass
OLFINE Exp. 4200 (manufactured by Nissin Chemical Industry Co., Ltd., surfactant): 1 part by mass
Ion exchange water: the amount set such that the total amount of the composition reaches 100 parts by mass In a case where the character shown in FIG. 1 was output using the ink composition of each example and the colored ink described above, since the jettability of the ink composition was satisfactory so that a solid image with excellent concealability was obtained, light was not seen through the white color of the base, and the visibility of the character was excellent. On the contrary, in a case where the character shown in FIG. 1 was output using the ink compositions of Comparative Examples 1 to 4 and the colored ink described above, the jettability of the ink composition was poor, the concealability of the solid image as a base was poor, and light was seen through the white color of the base. Therefore, the visibility of the character was poor.

What is claimed is:

1. An ink set, comprising:
   an ink composition; and
   a colored ink composition,
   wherein the ink composition comprises:
      titanium dioxide particles;
      metal oxide particles;
      a first dispersant; and
      water,
      wherein an average particle diameter of the titanium dioxide particles is 100 nm or greater,
      an average particle diameter of the metal oxide particles is smaller than the average particle diameter of the titanium dioxide particles,
      the metal oxide particles are oxide particles of at least one metal selected from the group consisting of zirconium, aluminum, silicon, zinc, and iron, and
      an acid value of the first dispersant is 50 mgKOH/g or less;
   wherein the colored ink composition comprises:
      a colorant;
      a second dispersant; and
      water,
      wherein an acid value of the second dispersant is greater than 50 mgKOH/g.

2. The ink set according to claim 1,
   wherein the metal oxide particles are at least one kind of particles selected from the group consisting of zirconium dioxide, aluminum oxide, silicon dioxide, zinc oxide, and diiron trioxide.

3. The ink set according to claim 1,
   wherein the average particle diameter of the metal oxide particles is in a range of 20 nm to 80 nm.

4. The ink set according to claim 1,
   wherein a content of the metal oxide particles is in a range of 0.5% by mass to 35% by mass with respect to a content of the titanium dioxide particles.

5. The ink set according to claim 1,
   wherein the metal oxide particles are at least one kind of particles selected from the group consisting of zirconium dioxide, aluminum oxide, and silicon dioxide.

6. The ink set according to claim 1,
   wherein the metal oxide particles are zirconium dioxide particles.

7. The ink set according to claim 1,
   wherein an absolute value of a difference between the average particle diameter of the titanium dioxide particles and the average particle diameter of the metal oxide particles is 50 nm or greater.

8. The ink set according to claim 1,
   wherein an absolute value of a difference between the average particle diameter of the titanium dioxide particles and the average particle diameter of the metal oxide particles is in a range of 100 nm to 200 nm.

9. The ink set according to claim 1,
   wherein the average particle diameter of the titanium dioxide particles is 200 nm or greater, and the average particle diameter of the metal oxide particles is 60 nm or less.

10. The ink set according to claim 1, wherein the ink composition further comprises:
a water-soluble solvent.

11. The ink set according to claim 10,
wherein a content of the water-soluble solvent is in a range of 5% by mass to 40% by mass with respect to a total mass of the ink composition.

12. The ink set according to claim 10,
wherein the water-soluble solvent is a glycol-based organic solvent.

13. The ink set according to claim 6,
wherein an average particle diameter of the zirconium dioxide particles is 80 nm or less.

14. The ink set according to claim 6,
wherein an average particle diameter of the zirconium dioxide particles is in a range of 20 nm to 60 nm.

15. The ink set according to claim 1,
wherein the ink set is used for ink jet recording.

16. An image recording method comprising:
applying the ink composition in the ink set according to claim 1 onto a base material; and
applying the colored ink composition onto the base material.

17. The ink set according to claim 1,
wherein the titanium dioxide particles are subjected to a surface treatment such that the particles are having at least one of silicon dioxide and aluminum oxide on each surface thereof.

\* \* \* \* \*